United States Patent
Nishida

(10) Patent No.: US 9,645,666 B2
(45) Date of Patent: May 9, 2017

(54) DISPLAY DEVICE WITH TOUCH PANEL ATTACHED

(71) Applicant: Sharp Kabushiki Kaisha, Osaka (JP)

(72) Inventor: Osamu Nishida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 126 days.

(21) Appl. No.: 14/443,633

(22) PCT Filed: Nov. 18, 2013

(86) PCT No.: PCT/JP2013/081053
§ 371 (c)(1),
(2) Date: May 18, 2015

(87) PCT Pub. No.: WO2014/080864
PCT Pub. Date: May 30, 2014

(65) Prior Publication Data
US 2015/0309646 A1     Oct. 29, 2015

(30) Foreign Application Priority Data
Nov. 22, 2012  (JP) ................................ 2012-255997

(51) Int. Cl.
G06F 3/041    (2006.01)
G06F 3/044    (2006.01)
G06F 3/0354   (2013.01)

(52) U.S. Cl.
CPC ........ G06F 3/0416 (2013.01); G06F 3/03545 (2013.01); G06F 3/044 (2013.01);
(Continued)

(58) Field of Classification Search
CPC . G06F 3/02; G06F 3/041; G06F 3/042; G06F 3/043; G09G 5/00; G06K 11/06; G08C 21/00
See application file for complete search history.

(56) References Cited

U.S. PATENT DOCUMENTS

| 5,748,110 A * | 5/1998 | Sekizawa ................ G06F 3/046 178/18.07 |
| 2006/0244735 A1* | 11/2006 | Wilson .................. G06F 3/0488 345/173 |
| 2010/0053109 A1* | 3/2010 | Narita ..................... G06F 3/042 345/173 |

FOREIGN PATENT DOCUMENTS

| JP | H7-13681 A | 1/1995 |
| JP | 2012-146026 A | 8/2012 |
| WO | 2013/065272 A1 | 5/2013 |

* cited by examiner

Primary Examiner — Pegeman Karimi
(74) Attorney, Agent, or Firm — Chen Yoshimura LLP

(57) ABSTRACT

A display device equipped with a touch panel includes a touch panel unit, a touch panel control unit, a pen incline information acquiring unit, a coordinate correction unit, and a display panel unit. The touch panel control unit detects a touch upon a touch panel surface, and acquires touch point coordinate information which is information for specifying a location which is touched on the touch panel surface. The pen incline information acquiring unit acquires pen or input member incline information, which is information relating to an angle which is formed by the touch pen and the touch panel surface when the touch pen and the touch panel face are in contact. The coordinate correction unit corrects, on the basis of the pen incline information, the touch point coordinate information when the line is drawn with the touch pen or input member upon the touch panel screen.

10 Claims, 7 Drawing Sheets

(52) U.S. Cl.
CPC .......... *G06F 3/0412* (2013.01); *G06F 3/0418* (2013.01); *G06F 2203/04101* (2013.01); *G06F 2203/04104* (2013.01); *G06F 2203/04112* (2013.01)

DISPLAY DEVICE WITH TOUCH PANEL ATTACHED

TECHNICAL FIELD

The present invention relates to drawing technology. In particular, the present invention relates to technology for correcting and displaying (drawing) a line drawn on a touch panel using a touch pen for a display device equipped with the touch panel.

BACKGROUND ART

There are display devices equipped with touch panels attached capable of inputting, by handwriting, data such as characters and graphics using a touch pen. In this kind of display device equipped with a touch panel, a user draws a character, graphic, or the like that the user wants to input with the touch pen on the touch panel, thereby causing the data related to the character, graphic, or the like to be inputted into the display device equipped with a touch panel, and the inputted data is displayed on a display surface of the display device equipped with a touch panel.

Touch panels are known to use a resistance film system, electrostatic capacitance system, infrared light system, or the like. Recently, many electrostatic capacitance system touch panels capable of being implemented at low cost with excellent durability are being used.

Electrostatic capacitance system touch panels each have diamond-shaped X-axis patterned detection electrodes and Y-axis patterned detection electrodes that are disposed in a lattice shape such that the X-axis patterned detection electrodes and the Y-axis patterned detection electrodes do not overlap in a plan view. The electrostatic capacitance system touch panels detect a touch point (a point touched by a touch pen, finger, or the like) by using the X-axis patterned detection electrodes and the Y-axis patterned detection electrodes to detect a change in the electric field generated from touching any point on the electrostatic capacitance system touch panel with the touch pen.

In electrostatic capacitance system touch panels, if a touch point is away from the vicinity of the center of the X-axis patterned detection electrodes and the Y-axis patterned detection electrodes, the accuracy for detecting the touch point position is increased by detecting position information for the touch point using interpolation (see Patent Document 1, Japanese Patent Application Laid-Open Publication No. H7-13681, for example).

SUMMARY OF THE INVENTION

Problems to be Solved by the Invention

However, when a straight line is drawn using a touch pen on an electrostatic capacitance system touch panel, the coordinate information corresponding to the straight line cannot be acquired with excellent precision, and if data is displayed on the display surface of the display device using the coordinate information, the line that should be a straight line is displayed (drawn) as an undulating line (wavy line). This is because the sensor of the electrostatic capacitance system touch panel (electrostatic capacitance type touch panel) has differing sensitivity to the change in the electric field at the regions around the so-called bridges, which intersect the X-axis patterned detection electrodes and the Y-axis patterned detection electrodes, and to the change in the electric field at the regions beside the bridges, in a plan view. Accordingly, particularly if a straight line is drawn on the touch panel surface with a touch pen inclined relative to the touch panel surface, an error occurs in the coordinate data acquired using the electrostatic capacitance type touch panel due to the difference in the sensitivity to the change in the electric field at the regions around the bridges and to the change in the electric field at the regions beside the bridges. If data is displayed on the display device in accordance with coordinate data that includes this error, the line that should originally be a straight line is displayed as an undulating line (wavy line).

With conventional technology, coordinates cannot be corrected with excellent precision for points drawn with a touch pen at an incline relative to the sensor surface (touch panel surface) of the electrostatic capacitance type touch panel, because there has been no recognition of the issues described above.

Therefore, taking into consideration the above problems, an objective of the present invention is to provide a display device equipped with a touch panel capable of correcting, with high precision, even a line drawn on the touch panel with an inclined touch pen.

Means for Solving the Problems

In order to solve the above-mentioned problem, a first configuration is a display device equipped with a touch panel configured to detect a touch by an input member, including: a display panel unit; a touch panel unit; a touch panel control unit; an incline information acquiring unit; and a coordinate correction unit.

The display panel unit has a display surface on which the display panel unit displays data.

The touch panel unit has touch panel surface, disposed so as to cover the display surface of the display panel unit.

The touch panel control unit detects a touch on the touch panel surface and acquires touch point coordinate information for specifying a location where the touch panel surface is touched.

The incline information acquiring unit acquires incline information representing an angle of the input member relative to the touch panel surface when the input member contacts the touch panel surface.

The coordinate correction unit, when a line is drawn on the touch panel surface with the input member, corrects the touch point coordinate information in accordance with the incline information.

Effects of the Invention

The present invention can implement a display device equipped with a touch panel capable of correcting, with high precision, even a line drawn on a touch panel with an inclined touch pen.

DETAILED DESCRIPTION OF EMBODIMENTS

Embodiment 1

Embodiment 1 is described below with reference to figures.

<1.1: Configuration of Display Device Equipped with Touch Panel>

Figure 1:
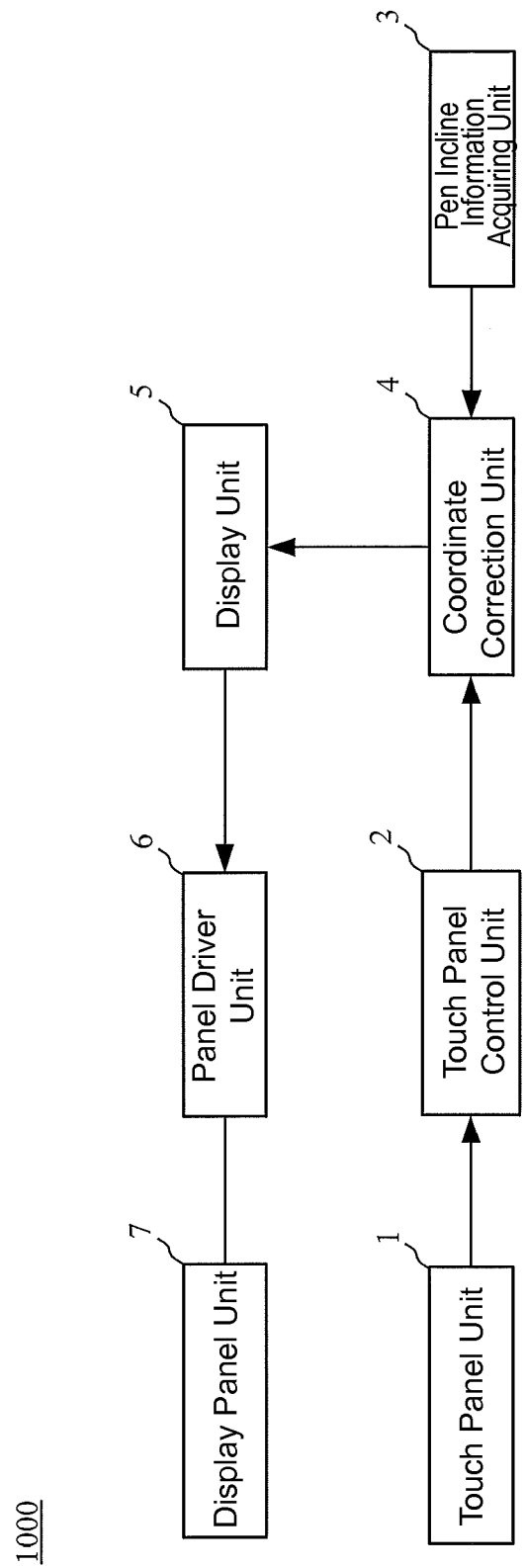
FIG. 1 is a schematic block diagram of a display device equipped with a touch panel 1000 according to Embodiment 1.

FIG. 1 is a schematic block diagram of a display device equipped with a touch panel 1000 according to Embodiment 1.

As shown in FIG. 1, the display device equipped with a touch panel 1000 is provided with a touch panel unit 1, touch panel control unit 2, pen incline information acquiring unit 3 (touch member incline information unit), coordinate correction unit 4, display processing unit 5, panel driver unit 6, and display panel unit 7.

The touch panel unit 1 is disposed such that a data display surface (not shown) of the display panel unit 7 is covered and outputs, to the touch panel control unit 2, an amount of change in the electric field or the like generated by touching the touch panel surface with a finger, pen (touch pen), or the like as a prescribed physical amount (an amount of electric current, amount of voltage, or the like generated in accordance with the change in the electric field, for example).

Note that the touch panel unit 1 is implemented using an electrostatic capacitance type touch panel, for example.

The touch panel control unit 2 inputs the prescribed physical amount (an amount of electric current, amount of voltage, or the like corresponding to a change in the electric field generated by touching the touch panel surface, for example) outputted from the touch panel unit 1. The touch panel control unit 2, in accordance with the physical amount inputted from the touch panel unit 1, acquires information (coordinate information, for example) about a touch position (a position touched by a finger, pen (touch pen), or the like) on the touch panel surface. The touch panel control unit 2 outputs the acquired information about the touch position to the coordinate correction unit 4.

The pen incline information acquiring unit 3 is an interface unit for receiving information related to an angle (an incline of a touch pen) of the touch panel surface to the touch pen (input member) when a user draws a line on the touch panel surface of the touch panel unit 1 with the touch pen. The pen incline information acquiring unit 3 outputs the received information related to the incline of the touch pen to the coordinate correction unit 4.

The coordinate correction unit 4 receives the information about the touch position outputted from the touch panel control unit 2 and the information related to the incline of the touch pen outputted from the pen incline information acquiring unit 3. The coordinate correction unit 4 specifies coordinate information for the touch position from the information about the touch position. The coordinate correction unit 4 corrects the coordinate information for the touch position based on the information related to the incline of the touch pen from the specified coordinate information (described in detail hereafter). The coordinate correction unit 4 also outputs the corrected data to the display processing unit 5.

The display processing unit 5 receives the corrected data outputted from the coordinate correction unit 4. The display processing unit generates display data and display control signals for driving the display panel unit 7 based on the corrected data generated by the coordinate correction unit 4. The display processing unit 5 also outputs, to the panel driver unit 6, the generated display data and display control signals for driving the display panel unit 7.

The panel driver unit 6 receives the display data and the display control signals outputted from the display processing unit 5. The display control signals include gate drive control signals and source drive control signals, for example. The panel driver unit 6 controls gate lines using the gate drive control signals and displays display data to the display panel unit 7 by outputting signals based on the display data to source lines using a timing corresponding to the source drive control signals.

The display panel unit 7 is connected to the panel driver unit 6 via a plurality of source lines and a plurality of gate lines, with pixels disposed at positions that intersect the source lines and gate lines. Each pixel contains a switching element connected to a gate line and a source line, and a display element (a liquid crystal element, for example). Each pixel performs a display that is based on the display data by the display element being controlled by the gate drive control signals outputted from the gate line and by the signals based on the display data outputted from the source line.

<1.2: Operation of Display Device Equipped with Touch Panel>

Operation of the display device equipped with a touch panel 1000 formed as above is described below.

Figure 2:
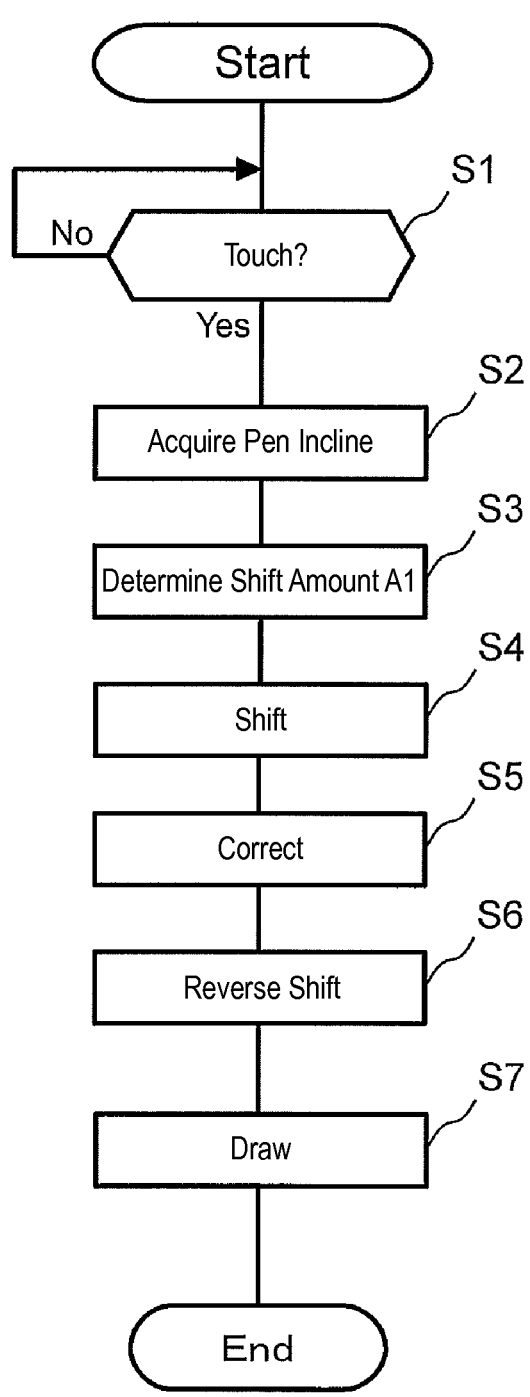
FIG. 2 is a flow chart showing processes for the display device equipped with a touch panel 1000 according to Embodiment 1.

FIG. 2 is a flow chart showing processes for the display device equipped with a touch panel 1000.

Figure 3:
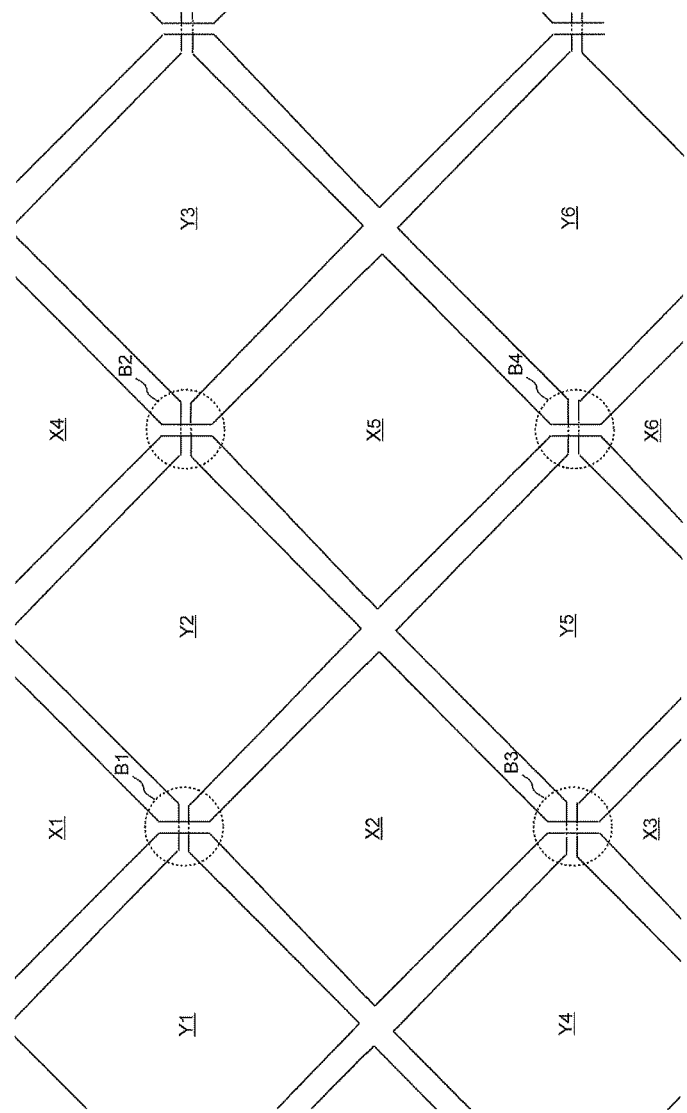
FIG. 3 is a view schematically illustrating a sensor surface of a touch panel unit 1 of the display device equipped with a touch panel 1000 according to Embodiment 1.

FIG. 3 is a view schematically illustrating a sensor surface of the touch panel unit 1 of the display device equipped with a touch panel 1000. FIG. 3 schematically shows X-axis patterned detection electrodes (X1 to X6), Y-axis patterned detection electrodes (Y1 to Y6), and bridges (B1 to B4) that form the sensors of the touch panel unit 1.

Figure 4:
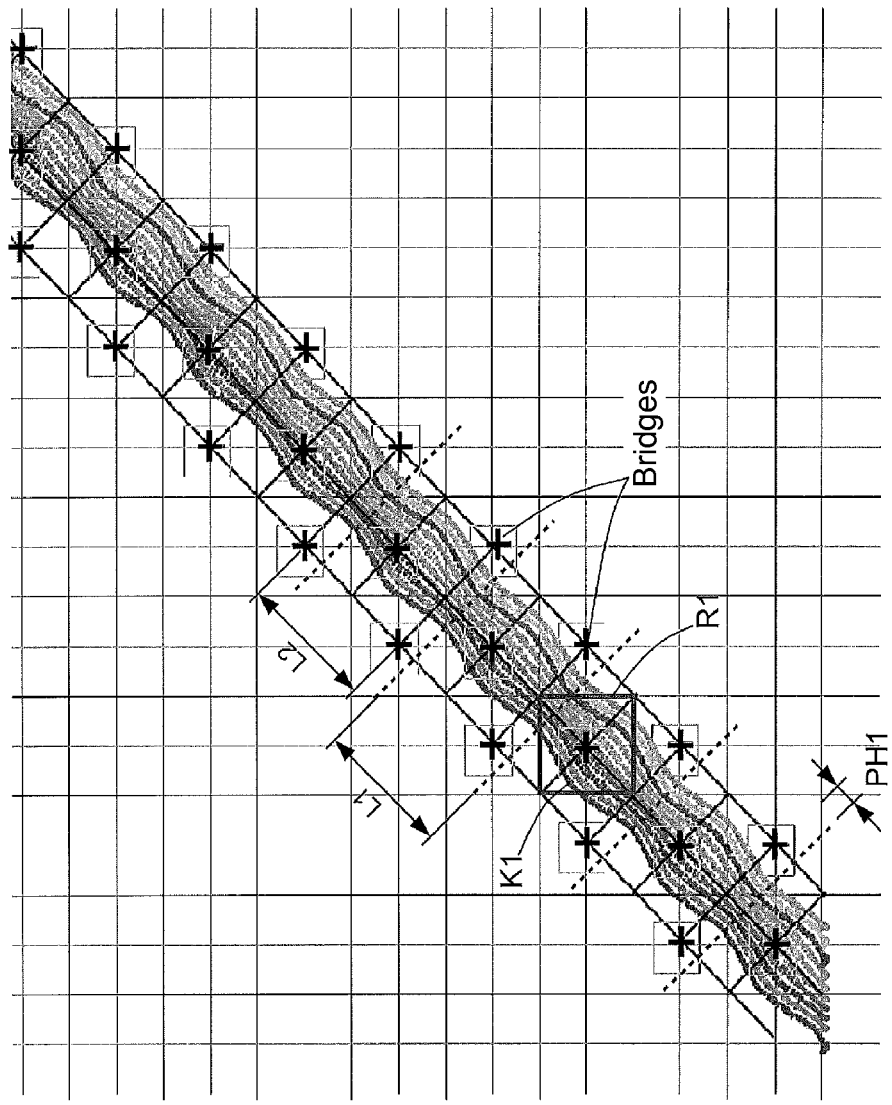
FIG. 4 is a view of drawn lines displayed on a display panel unit 7 when 10 straight lines are drawn with a touch pen at a 45° degree incline on a touch panel surface of the touch panel unit 1 of the display device equipped with a touch panel 1000 according to Embodiment 1.

FIG. 4 is a view of drawn lines displayed on the display panel unit 7 when 10 straight lines are drawn with a touch pen at a 45° degree incline on the touch panel surface of the touch panel unit 1 of the display device equipped with a touch panel 1000 (a view of drawn lines displayed without any corrections).

Operation of the display device equipped with a touch panel 1000 is described below with reference to FIGS. 2 to 7.

(S1):

The touch panel of the touch panel unit 1 monitors touch by a finger, pen, or the like. Specifically, the coordinate correction unit 4 detects a touch (contact with the touch panel by a finger, pen, or the like) by monitoring the output from the touch panel control unit 2 (Step S1). If a touch is detected (when there is a "yes" in Step S1), the coordinate correction unit 4 advances the process to Step S2.

(S2):

In Step S2, the coordinate correction unit 4 acquires the incline information for the touch pen received from the pen incline information acquiring unit 3. Note that the incline information for the pen is shown as an angle formed by the touch pen and the touch panel surface of the touch panel unit 1.

(S3):

In Step S3, the coordinate correction unit 4 determines a shift amount A1 based on the incline information for the touch pen.

As shown in FIG. 4, when straight lines are drawn on the touch panel surface of the touch panel unit 1 with an inclined touch pen, correct coordinate information cannot be acquired due the sensor having differing sensitivity to changes in the electric fields for the regions around the bridges and for the regions beside the bridges. Therefore, if a line is drawn on the display surface of the display panel unit 7 based on the acquired coordinate information, the line that should originally be a straight line is drawn as an undulating line (referred to as a "wavy line" hereafter). As understood from FIG. 4, a cycle L1 of the wavy line is substantially similar to the distance L2 between two obliquely adjacent bridges. It is also understood that the phase difference PH1 between the wavy lines and the intervals of the bridges continuously disposed obliquely (phase difference PH1 of FIG. 4) changes in accordance with the incline angle of the touch pen.

The coordinate correction unit 4 determines a shift amount A1 corresponding to the phase difference PH1 from the incline information for the touch pen. Note that the coordinate correction unit 4 may store data corresponding to the incline information for the touch pen and to the shift amount A1, which corresponds to the phase difference PH1, as a lookup table (LUT) or the like.

After executing the above process, the coordinate correction unit 4 advances the process to Step S4.

(S4):

In Step S4, the coordinate correction unit 4 shifts the wavy line based on the determined shift amount A1. Specifically, the coordinate correction unit 4 sets a square region that has one side thereof the same length as gaps between the bridges and the center thereof coinciding with the bridges as the region for correction. Note that the region R1 of FIG. 4 is one of the regions for correction. For convenience of description, a case in which a wavy line K1 is corrected using the region for correction R1 of FIG. 4 is described below as an example.

Figure 5:
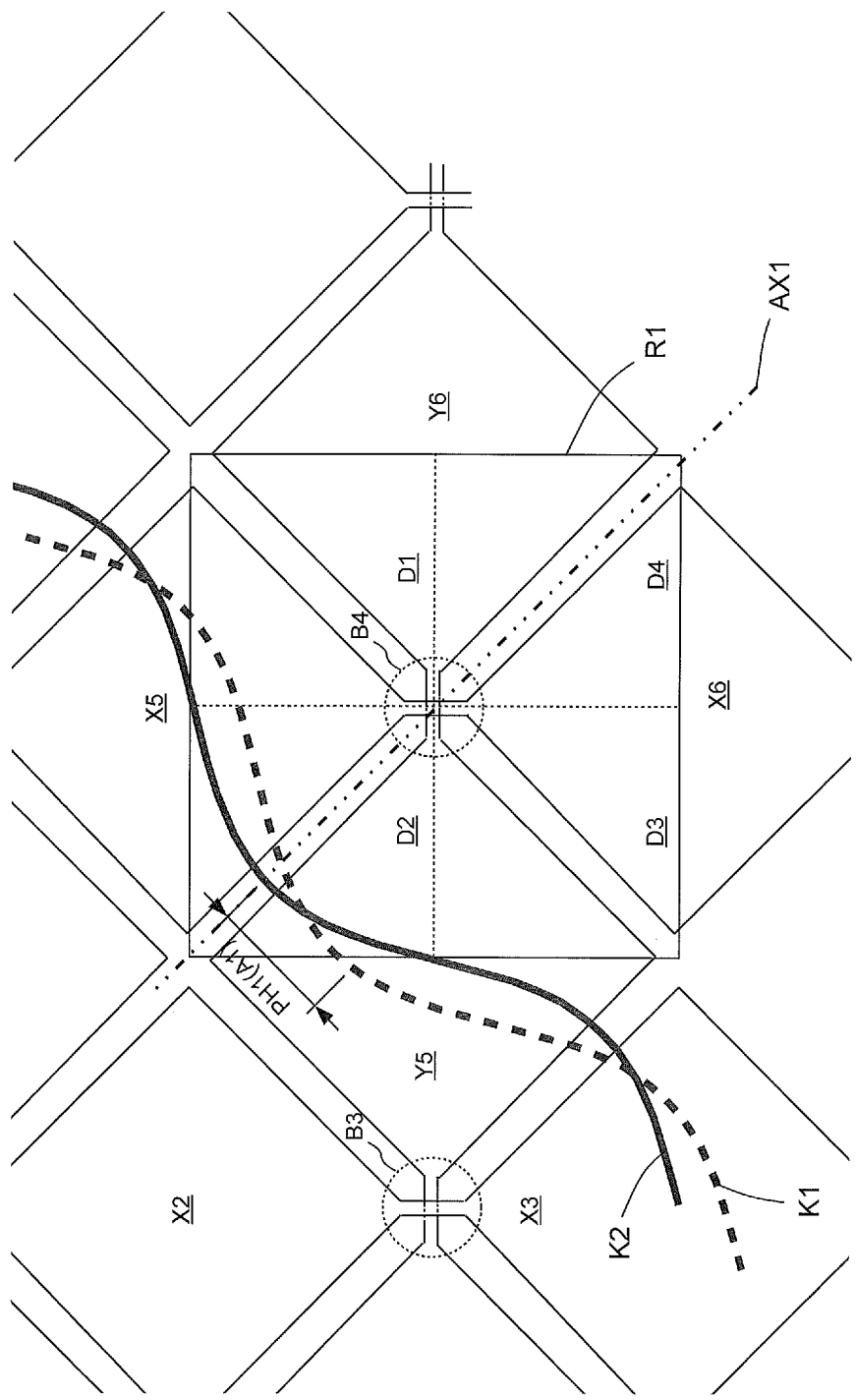
FIG. 5 is an enlarged view of a region around a region for correction R1.

FIG. 5 is an enlarged view of a region including the region for correction R1 of FIG. 4.

The coordinate correction unit 4 manages the region for correction R1 by dividing the region into four segmented regions. Specifically, the coordinate correction unit 4 segments the region for correction R1 into a first quadrant region D1, second quadrant region D2, third quadrant region D3, and fourth quadrant region D4, as is shown in FIG. 5, and corrects the wavy line contained in each region.

The coordinate correction unit 4 shifts the wavy line K1 using the determined shift amount A1 (the shift amount A1 corresponding to the phase difference PH1). Specifically, as shown in FIG. 5 in the second quadrant region, the coordinate correction unit 4 shifts the wavy line K1 such that the wavy line is in symmetry (in a direction to put the wavy line in symmetry) with a diagonal of the region for correction R1 running through the second quadrant (axis AX1 of FIG. 5) as the axis of symmetry. In FIG. 5, the wavy line K2 is a line that has been shifted by the coordinate correction unit 4.

After shifting in this manner, the coordinate correction unit 4 advances the process to Step S5.

(S5):

In Step S5, the coordinate correction unit 4 corrects the shifted wavy line (the coordinate information for the wavy line) in the second quadrant region. Specifically, the coordinate correction unit 4 stores only the correction data for the second quadrant and corrects the shifted wavy line K2 using the correction data for the second quadrant region.

Figure 6:
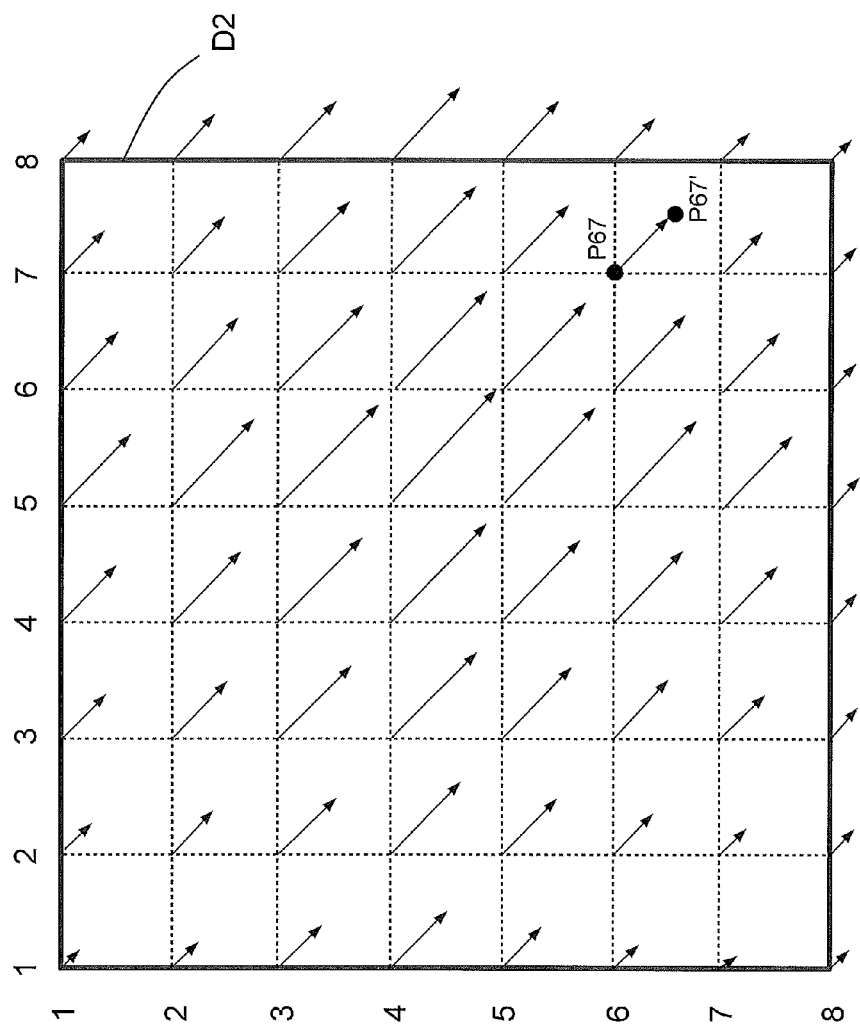
FIG. 6 is an example of correction data for a second quadrant region D2.

FIG. 6 is an example of the correction data for the second quadrant. As shown in FIG. 6, the coordinate correction unit 4 has correction data on a total of 64 points that are 8×8 evenly disposed points in the second quadrant region. Arrows shown in FIG. 6 are vectors pointing from the uncorrected coordinate data (coordinate points) to the corrected coordinate data (coordinate points). The coordinate correction unit 4 corrects such that the point P67 of FIG. 6 moves to point P67', or in other words, such that the coordinate data for point P67 becomes the coordinate data for point P67', for example.

Note that it is preferable that the correction data stored in the coordinate correction unit 4 be set such that as the correction data approaches the center of the second quadrant, the amount of movement to the bottom right direction (the correction amount) increases, as shown in FIG. 6.

In addition, when there are no points in the correction data for the second quadrant (when points beside the 8×8 points totaling 64 points of FIG. 6 are the points to be corrected), correction data for the points may be acquired by interpolation and the like using correction data for points close to the points to be corrected.

Figure 7:
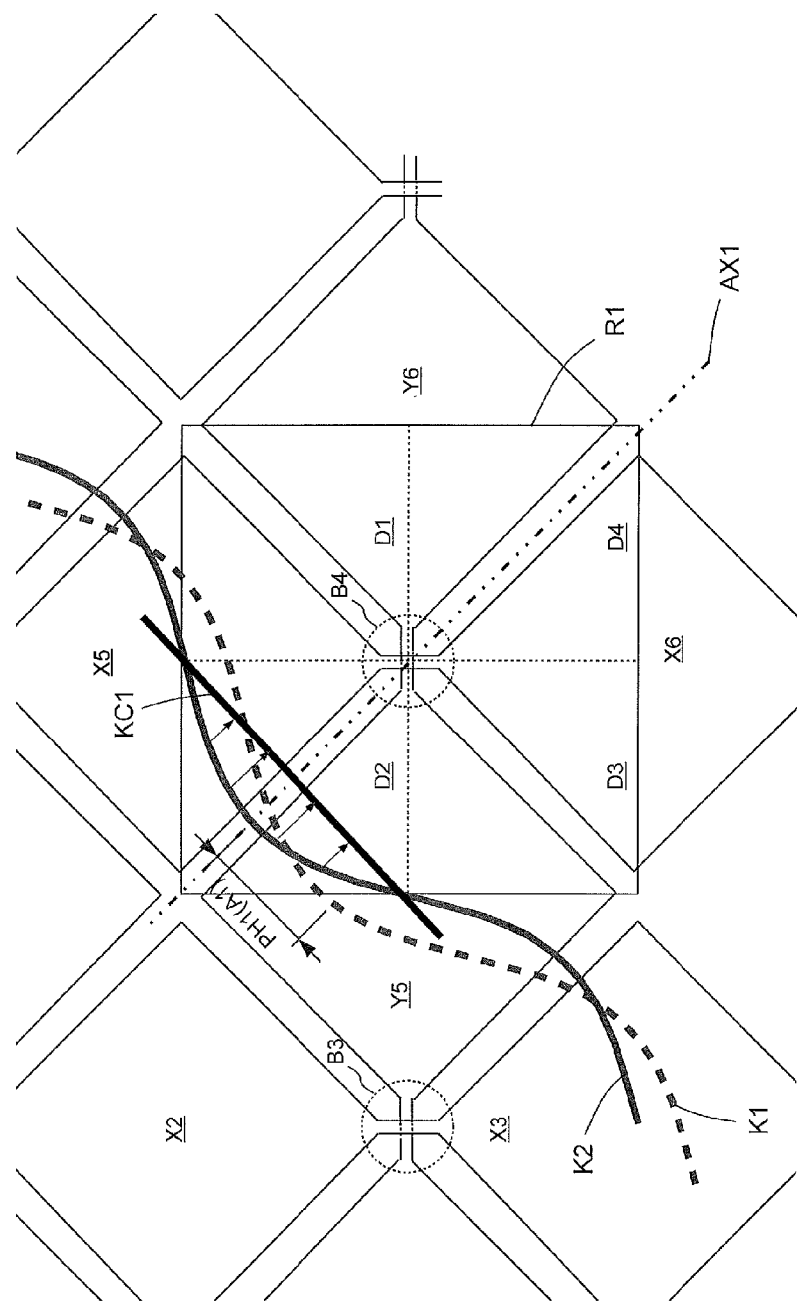
FIG. 7 is a view schematically illustrating the sensor surface of the touch panel unit 1 of the display device equipped with a touch panel 1000 according to Embodiment 1 (a view illustrating a corrected line KC1, in which the wave-shape was improved).

As shown in FIG. 7, the coordinate correction unit 4 is capable of acquiring a corrected line KC1, in which the wave-shape is improved, by correcting a shifted wavy line K2 using the correction data set as above (capable of acquiring coordinate data corresponding to a corrected line KC1).

Note that, when a wavy line contained in the fourth quadrant region D4 is corrected, first, the coordinate correction unit 4 converts the coordinate data for the fourth quadrant region D4 into data for the second quadrant region. The coordinate correction unit 4 rotates, counterclockwise 180° degrees, the coordinate data for the fourth quadrant region D4 of the region for correction R1 of FIG. 7, with the position of the bridge B4 as the center, for example. Thereafter, the coordinate correction unit 4 may correct using the correction data for the second quadrant region stored in the coordinate correction unit 4.

In addition, when a wavy line contained in the first quadrant region D1 is corrected, first, the coordinate correction unit 4 converts the coordinate data for the first quadrant region D1 into data for the second quadrant region. The coordinate correction unit 4 rotates, counterclockwise 90° degrees, the coordinate data for the first quadrant region D1 of the region for correction R1 of FIG. 7, with the position of the bridge B4 as the center, for example. Thereafter, the coordinate correction unit 4 may correct using the correction data for the second quadrant region stored in the coordinate correction unit 4.

In addition, when a wavy line contained in the third quadrant region D3 is corrected, first, the coordinate correction unit 4 converts the coordinate data for the third quadrant region D3 into data for the second quadrant region. The coordinate correction unit 4 rotates, clockwise 90° degrees, the coordinate data for the third quadrant region D3 of the region for correction R1 of FIG. 7, with the position of the bridge B4 as the center, for example. Thereafter, the coordinate correction unit 4 may correct using the correction data for the second quadrant region stored in the coordinate correction unit 4.

Note that when the degree of waviness is small for the wavy line contained in the first quadrant region D1 and the third quadrant region D3 and the line is close to a straight line, the correction data for the second quadrant region D2 does not worsen the degree of waviness because the correction data causes a shift towards the bottom right direction.

The coordinate correction unit 4 may also store the correction data for the second quadrant region as a lookup table (LUT) and may acquire the correction data for the second quadrant region using a calculation.

The coordinate correction unit 4 may also store the correction data for the second quadrant region as basic correction data and carry out the correction using correction data in which the basic correction data is multiplied by a coefficient coe. As shown in FIG. 6, if a correction vector for the basic correction data pointing from an uncorrected coordinate point towards a corrected coordinate point is made into Vec 0 (x, y), the coordinate correction unit 4 may carry out the correction using correction data in which:

$$Vec1(x,y) = coe \times Vec0(x,y)$$

where Vec 1 (x, y) and Vec 0 (x, y) are vectors that point towards corrected coordinate points (x', y'), with the uncorrected coordinate points (x, y) as the starting point, for example.

The coordinate correction unit 4 may also adjust the coefficient coe in accordance with the incline angle of the touch pen. When adjusting the coefficient, it is preferable to make the coefficient coe a greater value as the incline angle of the touch pen (the angle formed by the touch panel surface and the touch pen) decreases.

The coordinate correction unit 4 may also prevent excessive correcting by setting a maximum value for the correction amount and adjusting the coefficient coe.

After carrying out the correction, the coordinate correction unit 4 advances the process to Step S6.

(S6):

In Step S6, the coordinate correction unit 4 carries out reverse shifting. In other words, using the shift amount A1 used in shifting the line in Step S4, the coordinate correction unit 4 moves the line by the shift amount A1 in the direction opposite that of the direction shifted during shifting. Thus, the coordinate data corrected in Step S5 (coordinate data corresponding to the corrected line KC1) returns to the unshifted position. By drawing the line based on the reverse shifted coordinate data, the line is drawn with an improved degree of waviness (that is closer to that of a straight line) in the position of the original line.

After carrying out the correction, the coordinate correction unit 4 advances the process to Step S7.

(S7):

In Step S7, a line is drawn based on the coordinate data corrected by the coordinate correction unit 4. Specifically, the display processing unit 5 generates display data and display control signals for driving the display panel unit 7 based on the coordinate data outputted from the coordinate correction unit 4. The display processing unit 5 also outputs, to the panel driver unit 6, the generated display data and display control signals for driving the display panel unit 7. Thus, a line is drawn using the coordinate data corrected by the coordinate correction unit 4. As a result, the line is drawn with an improved degree of waviness (that is closer to that of a straight line) on the display surface of the display panel unit 7.

The line is drawn with an improved degree of waviness (that is closer to that of a straight line) by executing the above processes using the display device equipped with a touch panel 1000.

In this manner, with the display panel equipped with a touch panel 1000, the line is corrected using the incline information for the touch pen such that there is a reduction in the degree of waviness generated when a straight line is drawn on the touch panel with an inclined touch pen. Accordingly, with this display device equipped with a touch panel 1000, it is possible to correct, with high precision, even a line drawn on the touch panel with an inclined touch pen.

Modification Example

Next, a modification example of the present embodiment is described.

The display device equipped with a touch panel of the present modification example has the same configuration as the display device equipped with a touch panel 1000 of Embodiment 1. The display device equipped with a touch panel of the present modification example is different from the display device equipped with a touch panel 1000 of Embodiment 1 in that exceptional processing is carried out in the coordinate correction unit 4. Accordingly, the exceptional processing executed in the coordinate correction unit 4 of the display device equipped with a touch panel of the present modification example is described below.

Before executing Step S3 from the flowchart of FIG. 2, the coordinate correction unit 4 of the present modification example also detects a movement speed of the touch pen. Specifically, the coordinate correction unit 4 of the present modification example monitors coordinate data for touch points outputted from the touch panel control unit 2 in uniform sample intervals, and if the distance between two continuous touch points in chronological order is longer than a prescribed distance, the coordinate correction unit 4 determines that the movement speed of the touch pen is fast and does not correct as Embodiment 1 does (Steps S2 to S6 of FIG. 2). When the speed at which the touch pen moves is fast, the difference in capacitance between the regions around the bridges and the other regions of the sensor of the touch panel unit 1 has little effect. Therefore, when the speed at which the touch pen moves is fast, a favorable line can be drawn even without correction. Accordingly, with the display device equipped with a touch panel of the present modification example, when the speed at which the touch pen moves is determined to be fast, there are no corrections for reducing the degree of waviness because of the above process.

As above, with the display device equipped with a touch panel of the present modification example, a straight line can be appropriately drawn regardless of the speed at which the touch pen moves, because no corrections are executed for reducing the degree of waviness when the speed at which the touch pen moves is fast.

Other Embodiments

A program may implement a portion or the entirety of the processes from each function block of the above embodiments. Moreover, in a computer, a central processing unit (CPU) carries out a portion or the entirety of the processes from each function block of the above embodiments. In addition, the program for carrying out each process is stored in a storage device such as a hard disk or ROM and executed by reading the ROM or RAM.

The processes of the above embodiments may also be implemented using hardware or implemented using software (including cases in which the processes are implemented by an operating system (OS), middleware, or prescribed library). Moreover, the processes may be implemented using mixed processing from software and hardware.

In addition, the order of execution for the processing methods in the above embodiments are not necessarily limited by the description of the above embodiments, and the order of execution can be changed as long as there is no deviation from the gist of the invention.

The computer program that executes the aforementioned methods in the computer and a computer readable recording medium with the program thereof recorded therein are included in the scope of the present invention. Here, examples of a computer readable recording medium include a floppy disk, hard disk, CD-ROM, MO, DVD, DVD-ROM, DVD-RAM, high-density DVD, next-generation DVD, and semiconductor memory, for example.

The computer program is not limited to being recorded in the aforementioned recording mediums and may be transmitted through an electric communication line, wireless or wired communication line, network representative of the internet, or the like.

Note that specific configurations of the present invention are not limited to the aforementioned embodiments and can have a variety of changes and modifications as long as there is no deviation from the gist of the invention.

<Addendum>

Note that the present invention can be expressed as follows.

A first configuration is a display device equipped with a touch panel capable of inputting data from a touch pen, in which a display panel unit, touch panel unit, touch panel control unit, pen incline information acquiring unit, and coordinate correction unit are provided.

The display panel unit has a display surface and displays data on the display surface.

The touch panel unit has a touch panel surface set up such that the display surface is covered.

The touch panel control unit detects a touch on the touch panel surface and acquires touch point coordinate information, which is information for specifying a position where the touch panel surface is being touched.

The pen incline information acquiring unit acquires pen incline information, which is information related to an angle formed by the touch pen and the touch panel surface when the touch pen and the touch panel surface are in contact.

The coordinate correction unit corrects, based on the pen incline information, the touch point coordinate information when a line is drawn on the touch panel surface with the touch pen.

With this display device equipped with a touch panel, the pen incline information is acquired, and when a line is drawn on the touch panel surface with a touch pen, touch point coordinate information is corrected based on the acquired pen incline information, thereby allowing correction, with high precision, of even a line drawn on the touch panel with an inclined touch pen.

For a second configuration, the touch panel unit of the first configuration has X-axis patterned detection electrodes for specifying a position on a first direction for a position where the touch panel surface is being touched, Y-axis patterned detection electrodes for specifying a position on a second direction orthogonal to the first direction for a position where the touch panel surface is being touched, and bridges intersecting the X-axis patterned detection electrodes and the Y-axis patterned detection electrodes in a plan view.

The coordinate correction unit determines a correction shift amount based on the intervals between the bridges and the pen incline information, and corrects, based on the correction shift amount, the touch point coordinate information when a line is drawn on the touch panel surface with the touch pen.

With this display device equipped with a touch panel, a correction shift amount is determined based on the intervals between the bridges and the pen incline information, and when a line is drawn on the touch panel surface with a touch pen, the touch point coordinate information is corrected based on the determined correction shift amount, thereby allowing correction, with high precision, of even a line drawn on the touch panel with an inclined touch pen. The amplitude, cycle, phase difference, and the like of an undulating line drawn on the touch panel surface with an inclined touch pen is determined using the intervals between the bridges and the touch pen incline angle. Accordingly, with this display device equipped with a touch panel, corrections are carried out taking into consideration the intervals between the bridges and the touch pen incline angle, thereby allowing effective reduction of waviness in a line drawn on the touch panel surface with an inclined touch pen. As a result, with this display device equipped with a touch panel, it is possible to correct, with high precision, even a line drawn on the touch panel with an inclined touch pen.

For a third configuration, the coordinate correction unit of the second configuration sets up a rectangular region for correction that is centered on the same position as the position of a bridge, with sides that are the same length as the intervals between the bridges on the first direction; sets up a first quadrant region, second quadrant region, third quadrant region, and fourth quadrant region by evenly dividing the region for correction by the first direction and the second direction; and sets one of the four segmented regions as a correction execution region in a plan view. The coordinate correction unit also stores correction data on the correction execution region, converts, based on the correction shift amount, coordinate information for a line drawn on the touch panel surface with the touch pen such that the line is in symmetry in the correction execution region, and corrects the converted coordinate information using the correction data.

With this display device equipped with a touch panel, correction can be carried out with excellent efficiency while suppressing the amount of memory consumed, because it is sufficient to only store the correction data for one of the four segmented regions of the region for correction.

For a fourth configuration, the correction data of the third configuration is set such that, as the correction data approaches the center of the correction execution region, the correction data is corrected with a greater correction amount.

Thus, the coordinate data around the center of the correction execution region can be significantly corrected without much change to the coordinate data for the outer periphery of the correction execution region. As a result, with this display device equipped with a touch panel, correction can be carried out to appropriately improve the waviness of a line.

For a fifth configuration, the coordinate correction unit of the third or the fourth configuration converts coordinate information for a line within a region that is not the region set as the correction execution region such that the coordinate information becomes coordinate information for within the correction execution region, and corrects the converted coordinate information using the correction data.

Thus, coordinate information for even a line within a region that is not the region set as the correction execution region can be appropriately corrected.

For a sixth configuration, the coordinate correction unit of any of the third to fifth configurations does not carry out the correction on a line based on the touch point coordinate information when a movement speed of the touch point is greater than a prescribed value.

With this display device equipped with a touch panel, a straight line can be appropriately drawn regardless of the speed at which the touch pen moves, because no corrections are executed for reducing the degree of waviness when the speed at which the touch pen moves is fast.

INDUSTRIAL APPLICABILITY

The display device equipped with a touch panel according to the present invention is useful in industries related to display devices that input data and can be implemented in the aforementioned industries, because the present invention can correct, with high precision, even a line drawn on a touch panel using an inclined touch pen.

DESCRIPTION OF REFERENCE CHARACTERS

1000 display device equipped with a touch panel
1 touch panel unit
2 touch panel control unit
3 pen incline information acquiring unit
4 coordinate correction unit
5 display processing unit
6 panel driver unit
7 display panel unit

What is claimed is:

1. A display device equipped with a touch panel configured to detect a touch by an input member, comprising:
a display panel unit having a display surface on which the display panel unit displays data;
a touch panel unit having a touch panel surface, disposed so as to cover the display surface of the display panel unit;
a touch panel controller that detects a touch on the touch panel surface and acquires touch point coordinate information for specifying a location where said touch panel surface is touched;
an incline information acquirer that acquires incline information representing an angle of the input member relative to the touch panel surface when the input member contacts the touch panel surface; and
a coordinate corrector that, when a line is drawn on the touch panel surface with the input member, corrects the touch point coordinate information in accordance with said incline information,
wherein the touch panel unit has X-axis patterned detection electrodes for specifying a location in a first direction where the touch panel surface is touched, Y-axis patterned detection electrodes for specifying a location in a second direction orthogonal to the first direction where the touch panel surface is touched, and bridges that each respectively intersect said X-axis patterned detection electrodes and said Y-axis patterned detection electrodes in a plan view, and
wherein the coordinate corrector determines a correction shift amount in accordance with gaps between the bridges and the incline information, and corrects, in accordance with said correction shift amount, the touch point coordinate information from when the line is drawn on the touch panel surface with the input member.

2. The display device equipped with a touch panel according to claim 1,
wherein the coordinate corrector:
designates a rectangular correction region that has, in a plan view, one side thereof the same length as the gaps between the bridges in the first direction and that has a center at the same position as the bridges;
designates a first quadrant region, a second quadrant region, a third quadrant region, and a fourth quadrant region by evenly dividing said correction region in the first direction and the second direction,
designates one of the four divided regions as a correction execution region;
stores correction data corresponding to said correction execution region;
changes, in accordance with the correction shift amount, the coordinate information of the line drawn on the touch panel surface with the input member such that said line becomes symmetrical in the correction execution region; and
corrects the changed coordinate information using the correction data.

3. The display device equipped with a touch panel according to claim 2, wherein the correction data is set such that a correction amount becomes progressively greater towards a center of the correction execution region.

4. The display device equipped with a touch panel according to claim 3, wherein the coordinate corrector changes the coordinate information for the line within a region other than the correction execution region such that the coordinate information becomes coordinate information for within the correction execution region, and carries out the correction on the changed coordinate information using the correction data.

5. The display device equipped with a touch panel according to claim 4, wherein, when a movement speed of a touch point is greater than a prescribed value, the coordinate corrector does not perform the correction on the line in accordance with the touch point coordinate information.

6. The display device equipped with a touch panel according to claim 3, wherein, when a movement speed of a touch point is greater than a prescribed value, the coordinate corrector does not perform the correction on the line in accordance with the touch point coordinate information.

7. The display device equipped with a touch panel according to claim 2, wherein the coordinate corrector changes the coordinate information for the line within a region other than the correction execution region such that the coordinate information becomes coordinate information for within the correction execution region, and carries out the correction on the changed coordinate information using the correction data.

8. The display device equipped with a touch panel according to claim 7, wherein, when a movement speed of a touch point is greater than a prescribed value, the coordinate corrector does not perform the correction on the line in accordance with the touch point coordinate information.

9. The display device equipped with a touch panel according to claim 2, wherein, when a movement speed of a touch point is greater than a prescribed value, the coordinate corrector does not perform the correction on the line in accordance with the touch point coordinate information.

10. The display device equipped with a touch panel according to claim 1, wherein the input member is a pen or a finger.

* * * * *